Patented July 28, 1936

2,048,861

UNITED STATES PATENT OFFICE 2,048,861

PROCESS OF PRODUCING REFRACTORY BODIES

Ture Robert Haglund, Stockholm, Sweden

No Drawing. Original application May 17, 1933, Serial No. 671,591. Divided and this application April 16, 1934, Serial No. 720,911. In Germany April 12, 1933

9 Claims. (Cl. 25—156)

This is a division of my application Serial No. 671,591, filed May 17, 1933 which has become Patent 2,029,773.

The invention relates to a refractory article and a process of producing the same. Use is made of spinels, i. e. compounds between basic oxides such as MgO, FeO, BeO on the one hand and acid oxides such as $Al_2O_3$ and $Cr_2O_3$ on the other. The most important spinels are combinations of MgO, $Al_2O_3$ and MgO $Cr_2O_3$, containing MgO and $Al_2O_3$ or $Cr_2O_3$ in equimolecular proportions.

The spinels, which according to the invention are used for making refractory bodies, are produced by melting, while the raw mixture to be melted is so proportionated, that a molten mass is obtained, which besides spinels or spinel forming oxides contains substantially no other substances than silicates containing calcium.

Such masses can be melted from various raw materials, f. i. from the minerals bauxite, magnesite, dolomite, chromite without special difficulty. During the melting and the cooling of the molten mass spinels and silicates containing calcium are formed. These silicates are withdrawn from the cooled molten mass, which is surprisingly possible without great difficulty. By suitable proportionating of the charge, especially if this contains more than about 2 mols CaO to 1 mol $SiO_2$ a molten mass is obtained, which during or after the cooling, by storing, disintegrates itself in pulverous and granular materials and which can be dressed mechanically, chemically, magnetically, electrically or by a combination of several of these methods. As final products there are obtained on the one hand practically pure spinels and spinel forming oxides (as fine grains), and on the other hand silicates containing calcium, the greater part of which is in pulverous state. It is also possible, to carry through the dressing method chemically in such a manner, that only the calcium oxide is dissolved out of the silicates, while the silica remains with the spinels, which immediately can be used as binding means in the production of shaped refractory bodies.

It may here be mentioned, that the self disintegrating to pulverous and granular materials, as described, occurs even if the portion of silicates containing calcium in the molten mass only amounts to 20%. The charge of the furnace should, therefore be regulated accordingly.

The spinels obtained in the manner described by removing silicates containing calcium or calcium alone are moulded to bodies, while a mixture of granules is adjusted according to their sizes to be packed as tightly as possible and binding substances are added to the mixture of granules. The moulded bodies are then fired at high temperatures.

For preparing the mass to be moulded the grains are preferably graduated according to the Fuller-curve or other guides for the close packing of nonplastic granular material. But in practicing the moulding step first it should be determined what mixture of grains gives the highest weight for a unit of volume, when the grain mixture is shaken. F. i. first a mixture of granules according to the Fuller-curve should be prepared and the mixture shaken and the weight of the shaken mixture be determined. Then it should be determined whether an addition of coarser grains to the mixture or an addition of finely pulverized material, gives a mass with a higher weight per unit of volume. It is important, that a moulding mass be used, which is so proportionated in respect to the granule sizes, that after shaking, a unit weight as high as possible is obtained.

To this mass of granules binding material is added, f. i. clay, kaolin, silicates of alumina with high content of alumina, silica in amorphous state or as quartz, chromite, bauxite, preferably in sintered form or melted to corundum containing ferrous oxide, sillimanite, iron-oxides. Eventually can be added simultaneously cementing substances especially evaporizing, when burning the bodies. The addition of such cementing substances is of advantage, if binding substances are used, which act as binding media only at higher temperature. Cementing substances are f. i. sulfite-liquor, dextrine, glue, tar, resins, drying oils etc.

Burning at higher temperatures is important for the production of refractory bodies of high quality. In general, burning temperatures up to 1700° C. are to be used and the binding substances and the quantity of them to be chosen accordingly.

The base mass of the refractory bodies to be produced can consist, as mentioned above, of spinels alone or also of spinels and spinel forming oxides, obtained in the manner described, but it is also possible, to add other refractory raw materials in granular state, f. i. a mixture of spinels and corundum, magnesite, periclase, chromite etc. can be used. Especially the utilization of spinels together with a disintegrated cooled molten mass is to be mentioned, which contains as main constituents the oxides of aluminium, magnesium and chromium (up to 75% and more) and also small quantities of silicic acid (preferably less than 15%). Especially good bodies are obtained, if also for the additional substances the rule is considered, that these are capable of forming spinels and that the whole mass to be moulded shows a composition according to the spinel formula. F. i. is to be worked with spinels produced according to the invention, while adding magnesite in sintered form and simultaneously corundum and these additional substances in such a proportion, that the quantities of MgO are equal in mols to the quantities of $Al_2O_3$.

It is of advantage on the other hand to use an additional substance which shows a high spinel content, e. i. either minerals, rich in spinels, such as chromites or slags resulting from special processes, showing a high content of spinels. Such slags result f. i. at electro-thermic and aluminothermic processes, also in the production of ferro-chromium.

If chromite is used as additional substances, a method which is especially important, a chromium ore is to be selected, which shows a little content of silica. Further a spinel content as high as possible is desirable or at least such a composition, that as little free oxide as possible over the spinel-formula is present.

The mass to be moulded can be so adjusted, that either the spinels form the coarser constituents and the other substances are used in fine or finest form or that the other refractory substances as coarser grains are mixed with the spinels in fine or finest state. At the investigations of the inventor favorable results are obtained, if, while using chromite as starting material, the process is worked in the following manner:

Chromium ore is granulated, then separated from the finest particles, f. i. by sifting, and thereafter mixed with material of high spinel content, produced by melting and being in a fine state. The proportions of the individual substances are such, that a mass of high weight per unit of volume after shaking results. To this mass cementing substances are added. Then it is moulded by pressing under high pressure or by stamping and thereafter the bodies are burnt at high temperatures. The best results are obtained, if a chromium ore is used, the content of which in silica surpasses not over 3-5%.

The products according to the invention, f. i. bricks, plates, blocks, crucibles, tubes etc. show a high refractoriness, a high softening point under load, but also a very high resistance against chemical actions at high temperatures (slag-attacks) and good results at the spalling test (resistance against changes of temperatures). The new products must be considered refractory materials of highest quality.

The products according to the invention can also be used as paints or mortars, preferably mixed with a little quantity of clay.

*Examples.*

1. Chromium ore is crushed. Then by sifting or similar operation, the finest particles are removed and replaced by an according quantity of spinel product proper to the invention. To the mass water is added, and eventually also binding substances. The mass is moulded and the moulded bodies are burnt.

2. 100 parts spinels produced according to the invention are mixed with 100 parts of finely ground chromite and to this mixture 200 parts of coarser chromite and cementing substances are added. By pressing bodies are formed, dried and burnt. The burning temperature is more than Segercone-heat 20.

I claim:

1. Process of producing refractory bodies comprising melting raw materials together in proportions to form a molten mass consisting after solidification mainly of crystals of spinels and silicates containing lime, cooling the molten mass, and disintegrating the same, removing at least mainly the calcium compounds, molding the spinel mass into bodies of desired shape and burning the bodies.

2. Process of producing refractory bodies comprising melting raw materials together in proportions to form a molten mass consisting after solidification mainly of crystals of spinels and silicates containing lime, cooling the molten mass, and disintegrating the same, removing at least mainly the calcium compounds, proportioning the spinel crystals in size to obtain a closely packing aggregate, mixing a binder with said aggregate, molding the mixture to bodies of desired shape and burning the bodies at high temperature.

3. Process of producing refractory bodies comprising melting raw materials together in proportions to form a molten mass consisting after solidification mainly of crystals of spinels and silicates containing lime, cooling the molten mass, and disintegrating the same, removing at least mainly the calcium compounds, adding another substance in granular form having a high spinel content, proportioning the granules in size to obtain a closely packing aggregate, mixing a binder with said aggregate, molding the mixture to bodies of desired shape and burning the bodies.

4. Process of producing refractory bodies comprising melting raw materials together in proportions to form a molten mass consisting after solidification mainly of crystals of spinels and silicates containing lime, cooling the molten mass, and disintegrating the same, removing at least mainly the calcium compounds, adding spinel forming oxides, molding the mixture to bodies of desired shape and burning the bodies.

5. Process of producing refractory bodies comprising melting raw materials together in proportions to form a molten mass consisting after solidification mainly of crystals of spinels and silicates containing lime, cooling the molten mass, and disintegrating the same, removing at least mainly the calcium compounds, adding granular material containing at least 75% MgO, $Al_2O_3$ and $Cr_2O_3$ and less than 15% $SiO_2$, molding the mixture to bodies and burning the bodies.

6. Process of producing refractory bodies comprising melting raw materials together in proportions to form a molten mass consisting after solidification mainly of crystals of spinels and silicates containing lime, cooling the molten mass, and disintegrating the same, removing at least mainly the calcium compounds, adding granular chromium ore and binding material, molding the mixture to bodies and burning the bodies.

7. Process of producing refractory bodies comprising melting raw materials together in proportions to form a molten mass consisting after solidification mainly of crystals of spinels and silicates containing lime, cooling the molten mass, and disintegrating the same, removing at least mainly the calcium compounds, molding the spinel mass into bodies of desired shape and burning the bodies at a temperautre of at least 1700° C.

8. Process for producing refractory bodies comprising granulating chromium ore, treating the ore for removing fine particles, adding to the granular chromium ore a mass of fine grains rich in spinels, proportioning the grain sizes of the mixture to obtain close packing, adding binding substances, molding the mixture into bodies of desired shape and burning the bodies at high temperature.

9. Process of producing refractory bodies granulating chromium ore having a silica-content of not over 3-5%, removing fine particles from the granulated ore, adding to the granular chromium ore a mass of fine grains rich in spinels, molding the mixture into bodies of desired shape and burning the molded bodies.

TURE ROBERT HAGLUND.